United States Patent [19]

Brassert et al.

[11] Patent Number: 4,744,724
[45] Date of Patent: May 17, 1988

[54] ABSORPTION DYNAMOMETER

[75] Inventors: Walter L. Brassert, Belmont; Pat A. Capone, Lynnfield; Anthony F. Carter, Newton; Arnold M. Heitmann, Woburn; Willem Jansen, Woburn; Robert M. Sexton, Woburn; Salaiyur N. Thirumalaisamy, Newton, all of Mass.

[73] Assignee: Northern Research and Engineering Corp., Woburn, Mass.

[21] Appl. No.: 72,934

[22] Filed: Jul. 13, 1987

Related U.S. Application Data

[63] Continuation of Ser. No. 356,932, Mar. 10, 1982, abandoned.

[51] Int. Cl.⁴ .................... G01L 3/20; F01D 17/14
[52] U.S. Cl. .................... 415/158; 73/862.14; 415/94
[58] Field of Search ............ 415/78, 127, 158, 150, 415/206, 94; 73/862.14; 188/296

[56] References Cited

U.S. PATENT DOCUMENTS

| 2,425,171 | 8/1947 | Bennett et al. | 415/98 X |
| 2,672,954 | 3/1954 | Bennett | 73/862.14 X |
| 2,689,476 | 9/1954 | Van Ornum | 73/862.14 X |
| 3,300,122 | 1/1967 | Bowles | 415/206 X |
| 3,460,748 | 8/1969 | Erwin | 415/98 |
| 3,889,775 | 6/1975 | Luscher | 415/158 X |

FOREIGN PATENT DOCUMENTS 11982 6/1980 European Pat. Off. ............. 415/98

Primary Examiner—Robert E. Garrett
Assistant Examiner—Joseph M. Pitko
Attorney, Agent, or Firm—B. J. Murphy

[57] ABSTRACT

In the embodiment depicted, the dynamometer is of an absorption type, for fluid, having fluid entries on both axial ends thereof, and a rotor having blades disposed, in a radial exit flow path, in parallel with the rotor axis. Adjustable, annular, blade shrouds, controlled simultaneously, expose more or less of the blade lengths to the radial exit fluid flow path.

13 Claims, 2 Drawing Sheets

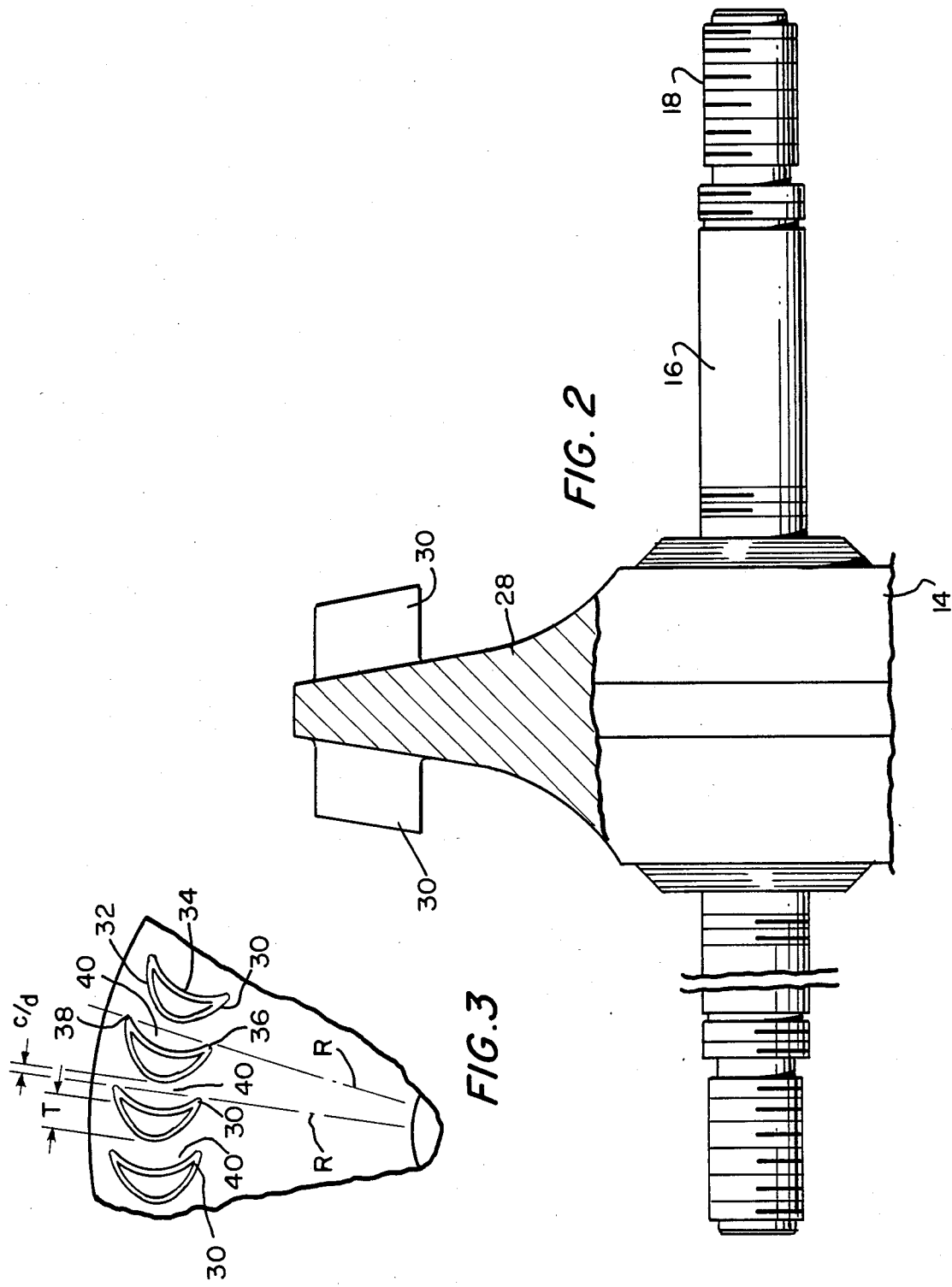

ABSORPTION DYNAMOMETER

This is a continuation of application Ser. No. 356,932, filed 03/10/82, now abandoned.

This invention pertains to dynamometer absorption type, and in particular, to such having means for controlling the degree of exposure of blades in its bladed rotor, to more or less fluid, in order that the power may, thereby, change at any speed.

It is an object of this invention to set an improved absorption dynamometer having a set of blades of novel configuration and controlling means of inventive design.

It is particularly an object of this invention set forth an absorption dynamometer, for fluid housing a housing structure; and a bladed rotor journaled in said structure; wherein said rotary axis; further including means for admitting fluid into said structure, for communication with said bladed rotor, from either of opposite directions; and wherein said rotor has a body of plurality of blades projecting from said body partially parallel with said axis.

Further objects of this invention, as well as the novel features thereof, will become more apparent by reference to the following description taken in conjunction with the accompanying figures, in which:

FIG. 2 is a partially cross-sectioned view of the major portion of the rotor of the embodiment of FIG. 1; and FIG. 3 is a fragmentary end view, taken from the left side of FIG. 2, of a portion of the rotor body showing some of the blades about the periphery thereof.

Figure 1:
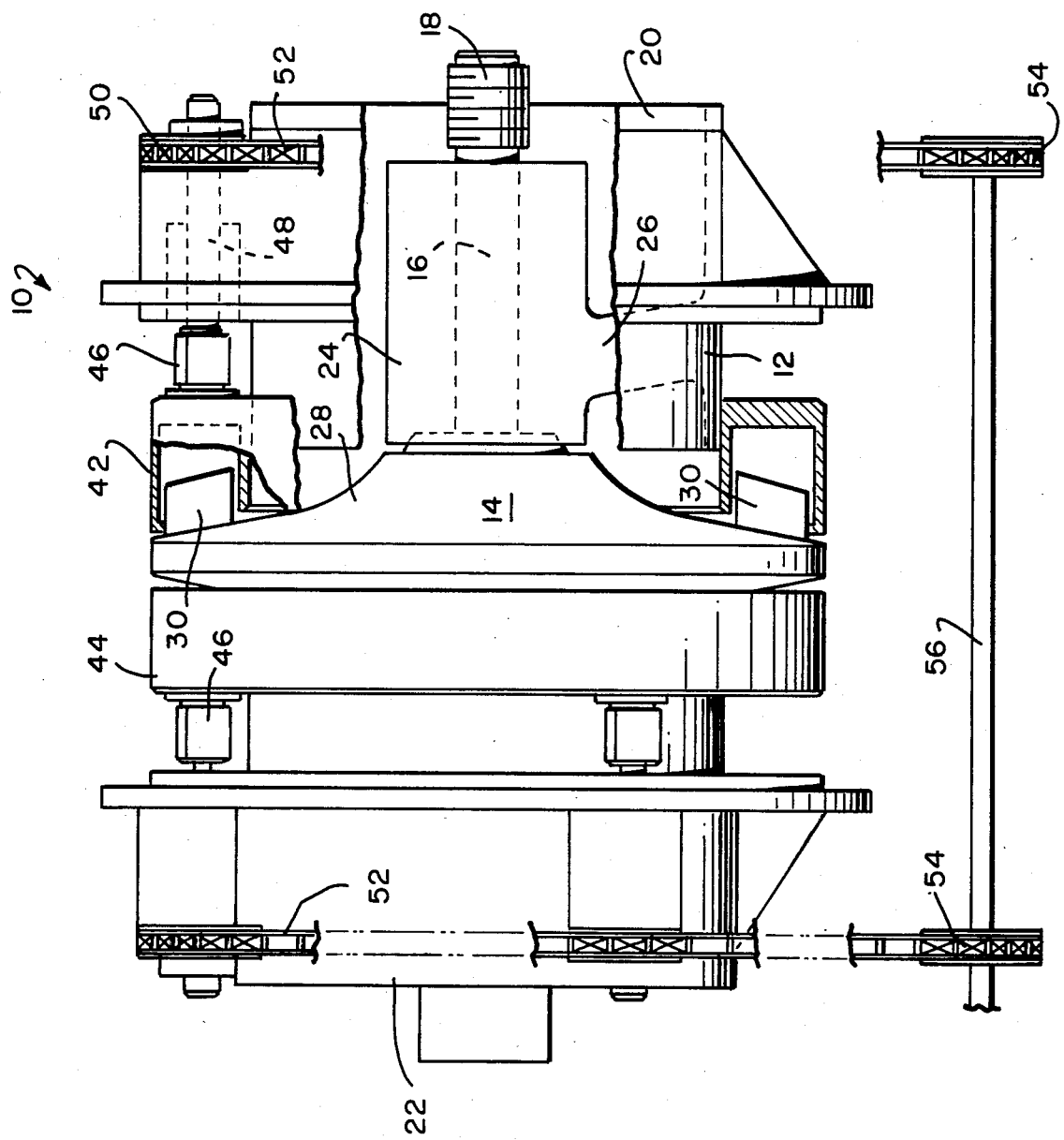
FIG. 1 is a side elevation view partly cross-sectioned, showing an absorption dynamometer, for fluid, according to an embodiment of the invention.

As shown in the figures, the novel absorption dynamometer 10, according to an embodiment thereof, comprises a structure 12 in which a bladed rotor 14 is rotatably journaled on an integral shaft 16. One end 18 of the shaft 16 comprises means for coupling thereof to a machine under test.

The structure 12 is open at opposite axial ends 20 and 22 to provide for admittance of fluid from both said ends. Centrally of the structure 12, within each end, are shaft support housings 24 (only one is shown) which are integral with three, equidistant struts 26 (only one is shown). The struts 26 bridge, radially, between the housings 24 and the inside, circumferential surface of the ends 20 and 22 of the structure 12. The rotor 14 has a body 28, and about the periphery of each side thereof is a series of arcuate blades 30, the blades being interposed in the radial exit flow paths for the fluid admitted from the ends 20 and 22.

Blades 30 are defined of convex and concave surfaces 32 and 34 which terminate at, and join, in lateral edges 36 and 38. Each blade has a greatest thickness "T" common to all thereof. The edges 36 and 38 of any blade occur on a radial line "R" drawn from the axial center of the rotor 14. The circumferential distance "c/d" obtaining between a given radial line "R", and a blade 30 most adjacent thereto, is less than said thickness "T". Even so, between blades 30, there subsists an arcuate channel 40 for fluid having a width which is greater than said thickness "T".

The structure 12 carries a pair of annular shrouds 42 and 44 which are selectively engageable with and disengageable from the blades 30 for occluding and exposing more or less of the blade lengths to the aforesaid radial exit flow paths for the fluid. Each annular shroud 42 and 44 is coupled to a ball nut 46 which is engaged with a ball screw 48. The latter terminates in a sprocket 50 which is engaged with an driven by a roller chain 52. There are three, circumferentially spaced apart ball nut, screw and sprocket arrangements on each side of the dynamometer 10, and each side has a separate drive chain 52. However, the threading of the ball screw 48 on one side of the dynamometer is of the opposite hand of the other. Hence, upon the roller drive chains 52 being turned in a common direction, the shrouds 42 and 44 on either sides will advance upon the rotor blades 30 in common, or withdraw therefrom in common. In order to drive the roller chains 52 in common, the latter are coupled to drive sprockets 54 mounted on a shroud control shaft 56. The latter is driven, selectively, by means not shown.

We state that the shrouds 42 and 44 engage and disengage the blades 30. Well, they do so, non-contactingly. The blade and shroud surfaces, of course, do not engage; the shrouds 42 and 44 move in close proximity to the blades 30 as they advance thereupon, to occlude the latter, and as they withdraw therefrom.

It will be appreciated that it is our teaching to provide axial blades 30 arranged on either side of the body of the rotor 14 oriented in a radial aerodynamic flow-path. As shown, the rotor 14 is rotatably supported between the housings 24 and the arcuate sides of the rotor turn the admitted fluid to radial flows. The blades 30, then, are interposed in the radially-exiting fluid flow paths. This configuration of rotor blading permits the variation of the effective length of the blades in the dynamometer and, thus, the power absorbed may be varied, with the speed held constant.

While we have described our invention in connection with specific embodiments thereof, it is to be clearly understood that this is done only by way of example, and not as a limitation to the scope of our invention as set forth in the objects thereof and in the appended claims.

We claim:

1. An absorption dynamometer, for fluid, comprising:
   a housing structure; and
   a rotor rotatably journaled in said structure; wherein said rotor has a rotary axis; further including
   means for admitting fluid into said structure for communication thereof with said rotor from either of opposite axial directions; and wherein
   said rotor has a body and a plurality of blades projecting from said body substantially parallel with said axis;
   said blades of said plurality are substantially radially disposed on said rotor, each blade having a radially innermost edge and a radially outermost edge, and said edges of each blade lie substantially on a given, discrete, radial line drawn from said axis; and
   each of said blades is spaced apart from blades immediately adjacent thereto, a given circumferential distance, thereby to define, on opposite sides of each said blade, open, unobstructed, radial flow paths for fluid; and further including
   means, coupled to said structure, selectively operative for occluding said blades, of said plurality thereof, from fluid admitted into said structure.

2. An absorption dynamometer, for fluid, according to claim 1, wherein:

said fluid admitting means further comprises means for admitting fluid into said structure from both of said opposite directions, simultaneously.

3. An absorption dynamometer, for fluid, according to claim 1, wherein:
said rotor body has an arcuately-formed surface, on at least one of opposite sides thereof, which defines a fluidconfronting surface; and
said blades of said plurality thereof project from said surface substantially normal thereto.

4. An absorption dynamometer, for fluid, according to claim 1, wherein:
said rotor body has fluid-confronting surfaces on opposite sides thereof; and
said blades of said plurality project from said surfaces substantially normal thereto.

5. An absorption dynamometer, for fluid, according to claim 4, wherein:
said blades are of arcuate cross-section, having opposite, concave and convex surfaces.

6. An absorption dynamometer, for fluid, according to claim 5, wherein:
each of said blades has, between said surfaces, a greatest thickness of a given dimension;
between (a) said radially innermost and said radially outermost edges of any one of said blades, and (b) a blade most adjacent thereto, there obtains the aforesaid given circumferential distance; and
said circumferential distance is of a dimension less than said given dimension.

7. An absorption dynamometer, for fluid, according to claim 1, wherein:
said occluding means comprises means for shrouding said blades.

8. An absorption dynamometer, for fluid, according to claim 7, wherein:
said occluding means further comprises means for moving said shrouding means in both of said axial directions.

9. An absorption dynamometer, for fluid, according to claim 1, wherein:
said blades have a given, common, axial length; and
said occluding means comprises means for selectively occluding and exposing any portion of, and substantially the entirety of, said common axial blade length.

10. An absorption dynamometer, for fluid according to claim 1 wherein:
said occluding means comprises means for shrouding said blades on both of said opposite sides of said rotor.

11. An absorption dynamometer, for fluid, according to claim 10, wherein:
said occluding means further comprises means for moving said shrouding means in both of said axial directions.

12. An absorption dynamometer, for fluid, according to claim 11, wherein:
said occluding means also includes means for moving said shrouding means in said both directions simultaneously.

13. An absorption dynamometer, for fluid, according to claim 12, wherein:
said shrouding means comprises a pair of annuluses.

* * * * *

UNITED STATES PATENT AND TRADEMARK OFFICE
CERTIFICATE OF CORRECTION

PATENT NO. : 4,744,724

DATED : May 17, 1988

INVENTOR(S) : Walter L. Brassert, et al

It is certified that error appears in the above—identified patent and that said Letters Patent is hereby corrected as shown below:

Column 1, lines 6 through 23 are changed to read as follows:

This invention pertains to dynamometers of the absorption type, and in particular, to such devices having means for controlling the degree of exposure, of blades in its bladed rotor, to more or less of the fluid, in order that the power may, thereby, be varied at any speed.

It is an object of this invention to set forth an improved absorption dynamometer having a bladed rotor of novel configuration and controlling means of innovative design.

It is particularly an object of this invention to set forth an absorption dynamometer, for fluid, comprising a housing structure; and a bladed rotor rotatably journaled in said structure; wherein said rotor has a rotary axis; further including means for admitting fluid into said structure for communication thereof with said bladed rotor, from either of opposite axial directions; and

UNITED STATES PATENT AND TRADEMARK OFFICE
CERTIFICATE OF CORRECTION

PATENT NO.   : 4,744,724

DATED        : May 17, 1988

INVENTOR(S)  : Walter L. Brassert, et al

It is certified that error appears in the above-identified patent and that said Letters Patent is hereby corrected as shown below:

wherein said rotor has a body and a plurality of blades projecting from said body substantially parallel with said axis.

Signed and Sealed this

Eighteenth Day of October, 1988

*Attest:*

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,744,724
DATED : May 17, 1988
INVENTOR(S) : Walter L. Brassert, et al It is certified that error appears in the above-identified patent and that said Letters Patent is hereby corrected as shown below:

In column 1, following line 5, insert:

--The U.S. Government has rights in this invention pursuant to Contract N00140-79-C-0160 awarded by the Department of the Navy.--.

Signed and Sealed this

Twenty-third Day of May, 1989

Attest:

DONALD J. QUIGG

Attesting Officer

Commissioner of Patents and Trademarks